(12) United States Patent
Catellani

(10) Patent No.: US 11,491,553 B2
(45) Date of Patent: Nov. 8, 2022

(54) HIGH-PERFORMANCE FACING HEAD

(71) Applicant: O.M.G. S.R.L., Cavriago (IT)

(72) Inventor: Corrado Catellani, Cavriago (IT)

(73) Assignee: O.M.G. S.R.L., Cavriago (IT)

( * ) Notice: Subject to any disclaimer, the term of this patent is extended or adjusted under 35 U.S.C. 154(b) by 226 days.

(21) Appl. No.: 17/046,623

(22) PCT Filed: Apr. 4, 2019

(86) PCT No.: PCT/IB2019/052753
§ 371 (c)(1),
(2) Date: Oct. 9, 2020

(87) PCT Pub. No.: WO2019/207383
PCT Pub. Date: Oct. 31, 2019

(65) Prior Publication Data
US 2021/0107067 A1    Apr. 15, 2021

(30) Foreign Application Priority Data
Apr. 24, 2018 (IT) .................. 102018000004836

(51) Int. Cl.
*B23B 29/03* (2006.01)
*B23B 29/034* (2006.01)

(52) U.S. Cl.
CPC .. *B23B 29/03471* (2013.01); *B23B 2260/028* (2013.01); *B23B 2260/07* (2013.01)

(58) Field of Classification Search
CPC ........ B23B 29/03439; B23B 29/03432; B23B 29/034; B23B 2260/126; B23B 2260/128; B23B 2260/07; B23Q 1/0027
See application file for complete search history.

(56) References Cited

U.S. PATENT DOCUMENTS 4,676,704 A    6/1987  Donnini et al.
4,852,438 A    8/1989  Reiterman
5,655,422 A    8/1997  Stolz et al.

FOREIGN PATENT DOCUMENTS

DE        9007396 U1    7/1991
JP        S5851008 A    3/1983
WO    2014111881 A1    7/2014

*Primary Examiner* — Alan Snyder
(74) *Attorney, Agent, or Firm* — Dickinson Wright PLLC; Andrew D. Dorisio

(57) ABSTRACT

A facing head includes a fixed part, couplable with a head of a machine tool via an interface plate and a rotary part, wherein a compartment is placed internally to which drive means and measurement means are housed for driving and measuring a radial slide supported by the rotary part so as to close the compartment, and at least one electric collector for controlling the drive means and measurement means. A continuous gasket contacts the radial slide and a fluid collector supplies the compartment with pressurized air to seal the compartment. The fluid collector includes a rotary portion with first fluid routes, and a fixed portion integral with the fixed part of the facing head with second fixed fluid routes together supplying the rotary part with a coolant, supplying the compartment with pressurized air, and transporting the oil for locking the radial slide.

18 Claims, 3 Drawing Sheets

HIGH-PERFORMANCE FACING HEAD

FIELD OF THE INVENTION

The present invention relates to a high-performance facing head.

Such facing head is suitable for being applied onto a machine tool to perform facing and boring operations, including one having a continuously variable diameter.

BACKGROUND

The existing facing heads are mostly equipped with a drive and measurement system for driving and measuring the radial position of the slide which is integral with the fixed part of the head, but in some embodiments such drive and measurement system is located in the rotary part of the head.

An advantage of the drive and measurement system being located in the rotary part of the head is in that it substantially increases the slide positioning accuracy, thanks to the fact that the amplitude of the clearances that take place between the slide and said drive and measurement system is reduced. Conversely, a disadvantage of this solution is in that it makes the motor and the measurement system undergo the operating conditions in which the head operates to a greater extent, with the risk for the coolant or small metal particles of getting in contact therewith and with their respective electrical connections.

In facing heads, the rotary motion of their rotary part is obtained, in most cases, by actuating the head by the spindle of the machine tool. This entails that the maximum torque available on the head equals the maximum one made available by the spindle of the machine tool which, in the case of small- and medium-size milling machines, is often such as not to allow to perform big-diameter boring operations.

Solutions exist for transmitting the rotary motion to the head through one or several transmission chains performing the function of reducing the speed of rotation of the head, i.e. increasing the torque available on the head itself as referred to the maximum one provided by the machine tool. The existing solutions adopted to transmit rotation through one or several speed reduction chains feature the disadvantage of transmitting the rotary motion by adopting keyed connections or grooved couplings, whereby torque sharing between the speed reduction chains is committed to the accuracy of the machinings. No matter how much accurate such machinings are, they are not such as to guarantee a good torque sharing between the speed reduction chains.

Also, the existing facing heads do not allow an automatic locking of the slide whenever it reaches its programmed radial position. This entails that, in precision boring operations, small radial movements of the slide might occur, with a consequent impairment of the degree of finishing of the machining made, which might result not to be acceptable.

There are facing heads that are preset to automatic tool change, which require that the tool holder device, which the tool is applied to, be provided with an automatic tool locking and unlocking system. The existing facing heads do not allow an automatic tool unlocking in any radial positions of the slide and in any radial positions of the tool holder device as referred to the slide itself. This entails that in some cases tool change shall be performed manually, thus exposing the operator to a hazard condition.

A prior art embodiment of a facing head is described, for instance, in document WO 2014/111881 A1, which the preamble of claim 1 is based on. However, the prior art facing heads are affected by the above-mentioned drawbacks, which are eliminated by the present invention.

SUMMARY

The main object of the present invention is to prevent infiltrations of liquids or dusts from taking place in the compartment that rotates together with the head, which accommodates a motor, a transducer, and other electrical parts, thus preventing this circumstance from causing faults.

A further object of the present invention is to provide a correct sharing of the torque between the various reduction chains.

Another object of the present invention is to allow for an automatic slide locking.

Another object of the present invention is to make it possible automatic tool change in any positions of the slide and in any positions of the tool holder as referred to the slide itself.

In accordance with the present invention, said objects are achieved by using a facing head for machine tools according to claim 1 and to the claims dependent thereon.

BRIEF DESCRIPTION OF THE DRAWING FIGURES

The features and advantages of the present invention will be apparent to those skilled in the art from the following detailed description of a practical embodiment thereof, which is shown for explanatory non-limitative purposes in the attached drawings, in which:

FIG. 1 schematically shows an axial cross section of a facing head according to the present invention, which shows two gear chains for transmitting rotation to the head;

FIG. 2 schematically shows a cross section, according to line II-II in FIG. 1, of a rotary part of the facing head which shows the drive and measurement systems located in the rotary part of the head itself inside a sealed compartment;

DETAILED DESCRIPTION

Figure 1:
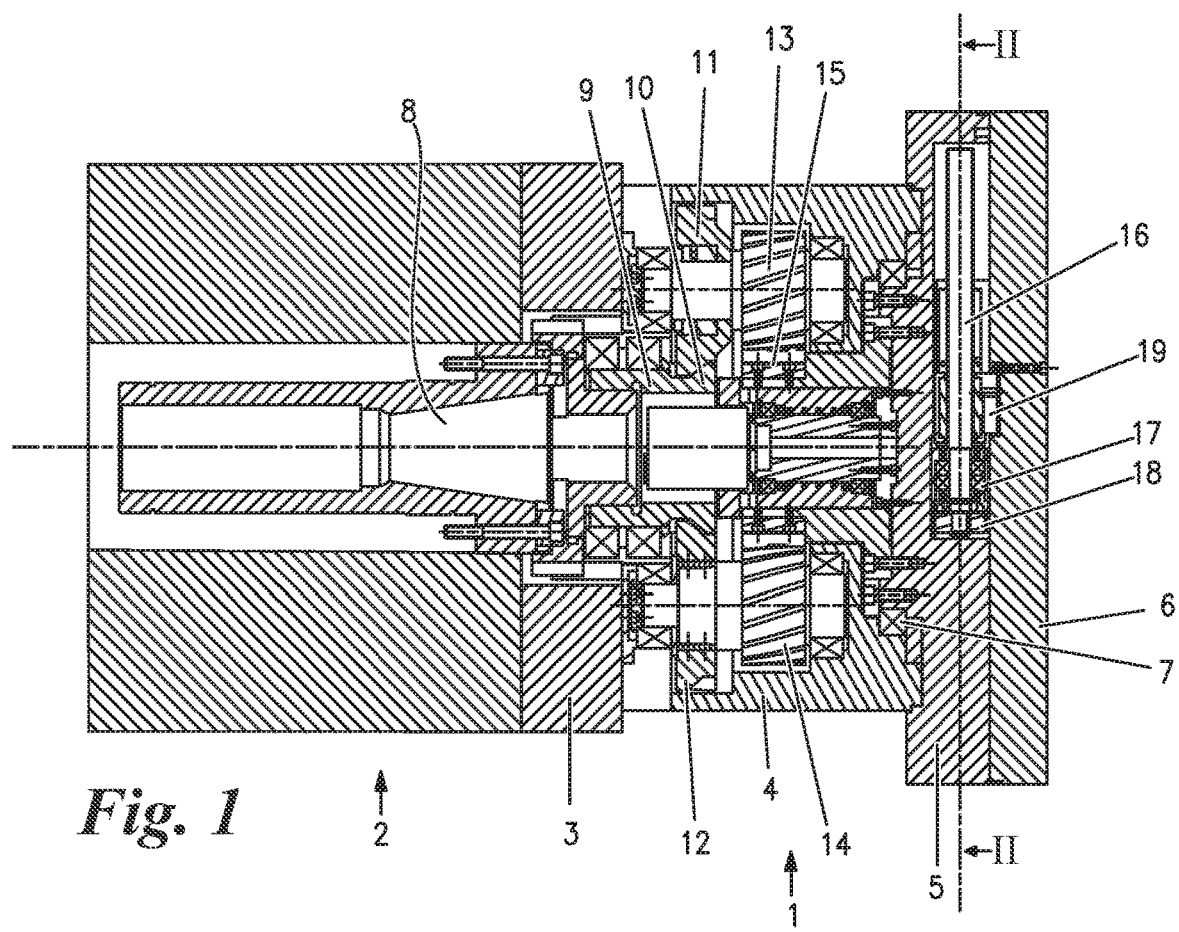

FIG. 1 shows a section crossing the axis of rotation of a facing head 1, according to the present invention, which can be coupled with the head of a machine tool 2 via an interface plate 3.

The facing head 1 basically comprises a fixed part 4 and a rotary part 5 which support a radial slide 6, said rotary part 5 being in turn supported by a bearing 7.

The facing head 1 is driven into rotation by a spindle 8 which the machine tool 2 is equipped with and transmission of the rotation is implemented via two gear chains. Specifically, each of the two gear chains comprises a first gear 11, 12 engaging an input gear 10 integral with a shaft 9 which is driven into rotation by the spindle 8. Each of said first gears 11, 12 is shrink-fixed onto a shaft integral with a second gear 13, 14 which in turn engages a gearwheel 15 integral with said rotary part 5 of the facing head 1.

Figure 2:
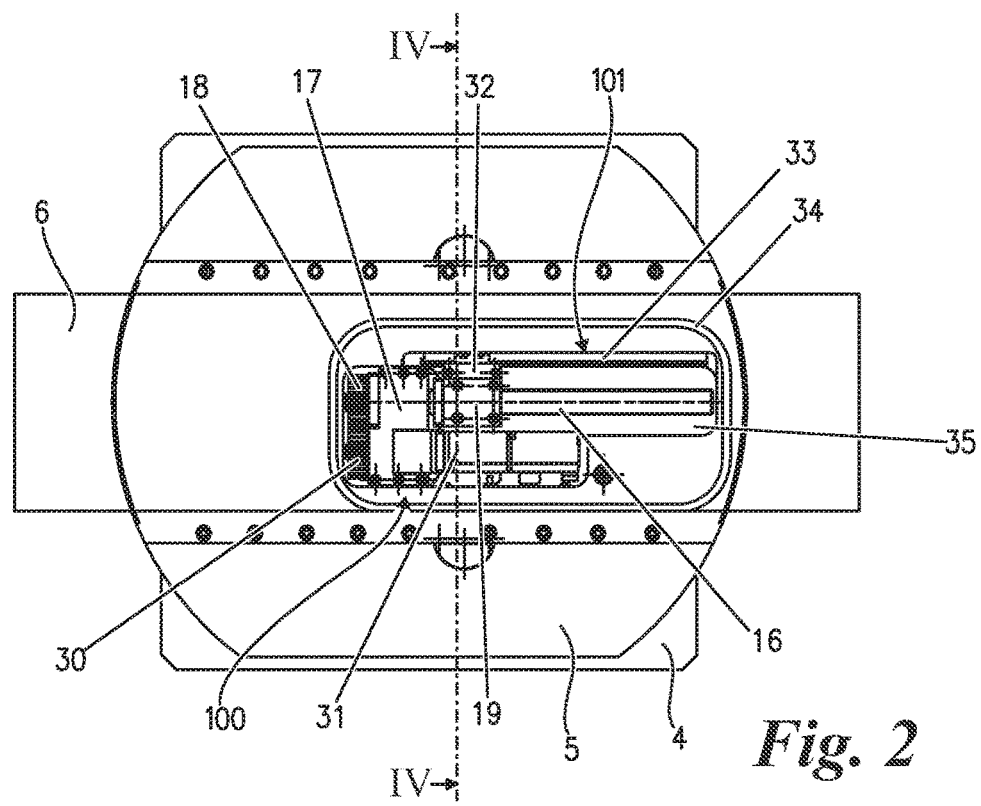

A compartment 35 is provided in the rotary part 5 of the facing head 1, internally to which there are drive means 100 and measurement means 101 for driving and measuring the radial slide 6, said radial slide 6 being configured in such a way as to close the compartment 35 (FIG. 2). Specifically, said drive means 100 comprise a recirculating ball screw 16 held by a fixed support 17 which is fastened to the rotary part 5. On the other hand, a nut bracket 19 sliding along the screw 16 is, on the contrary, integral with the radial slide 6. The compartment 35 also accommodates an electric motor 31, fastened to the rotary part 5, which transmits rotation to the recirculation ball screw 16 via a reducer and gears 18 and 30, thus allowing to move the radial slide 6.

The radial position of the slide 6 is measured by way of said measurement means 101 which comprise a linear transducer having a magnetic scale 33 fastened to the rotary part 5 and a read head 32 fastened to the nut bracket 19 which is integral with the radial slide 6.

At least one two-button limit switch is also fastened to the rotary part 5 of the facing head 1 and is driven by two cams integral with the radial slide 6.

Figure 3:
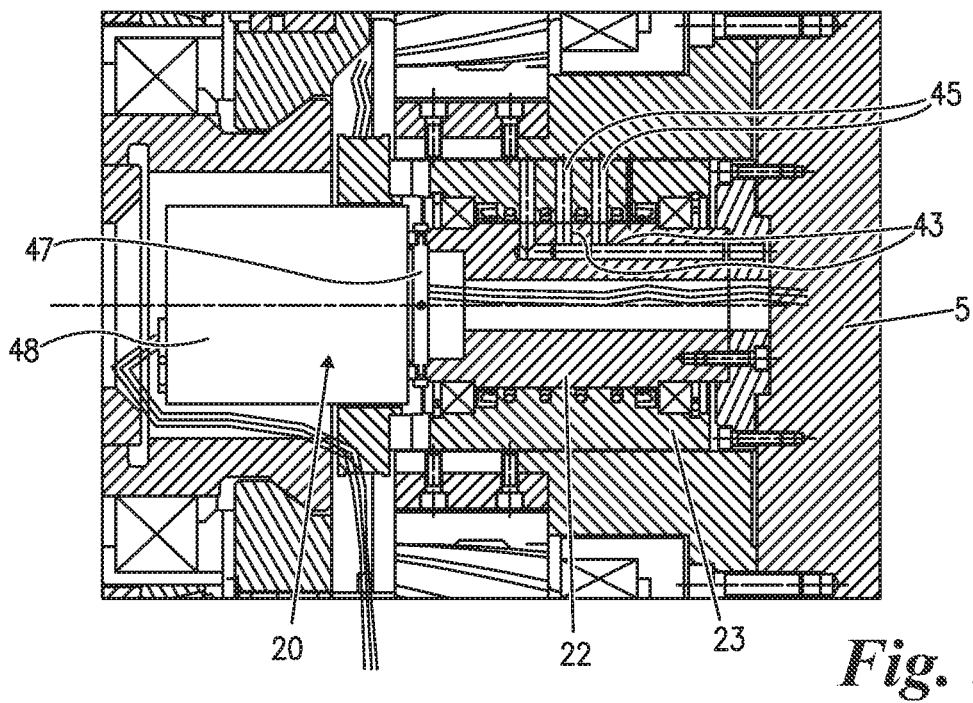
FIG. 3 shows a first detail of FIG. 1, wherein a fluid collector and an electric collector located in the central part of the head are visible.

The facing head 1 also comprises an electric collector 20 and a hydraulic collector which allow to perform the electric and fluid connections between the fixed part 4 and the rotary part 5 respectively (FIG. 3).

Specifically, all electrical connections are implemented by an electric collector 20 which comprises a rotary portion 47 integral with the rotary part 5 and is connected to the electric motor 31, to the linear transducer, to said at least one limit switch, and to the remaining rotary electrical parts of the facing head 1 via the electrical connections. A fixed portion 48 of the electric collector 20 is integral with the fixed part 4 of the head 1 and is connected, via the electrical connections, to a feeding and control equipment used for feeding and controlling the movement of the radial slide 6 according to known techniques.

All signals suitable for driving and controlling the radial movement of the slide 6 and the signals of said at least one limit switch are transmitted via the electric collector 20 whereas the power connections to supply power to the motor as well as to a brake, if any, are implemented through it. The electric collector 20 is provided with appropriate protections to prevent it from being hit by grease or other substances that might jeopardize its good operation.

On the other hand, the fluid connections are implemented via a fluid collector comprising a rotary portion 22, which is integral with the rotary part 5 of the head and comprises first fluid routes 43 internally thereto, and a fixed portion 23, which is integral with the fixed part 4 and comprises, internally thereto, second fixed fluid routes 45 coupled with the internal fluid routes 43.

The fluid collector is preset to supply the rotary part 5 with a coolant and, as better explained below, also to supply the compartment 35 of the rotary part 5 with pressurized air, as well as to transport the oil used for automatically locking the radial slide 6.

The compartment 35 of the rotary part 5 is externally surrounded by a recess 34 which accommodates a continuous sealing gasket 40 configured in such a way as to be fully in contact with the radial slide 6 (FIG. 2). Seal is provided by the compartment 35 in the rotary part 5 being kept to a pressure higher than the atmospheric pressure. This is achieved by using one of the routes of the fluid collector to carry pressurized air to the compartment 35 of the rotary part 5 of the head 1.

Figure 4:
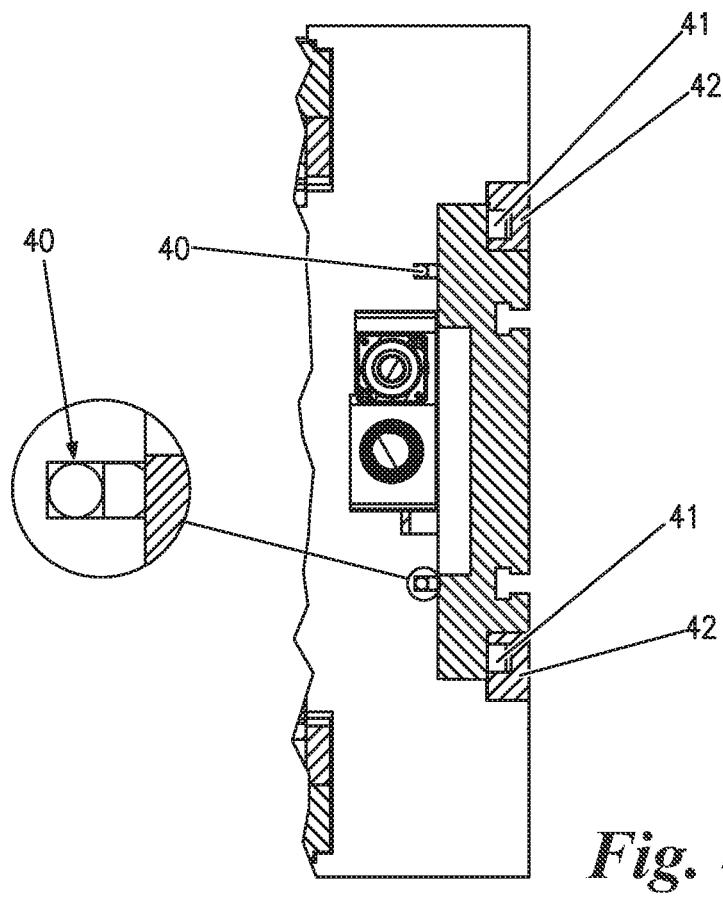
FIG. 4 shows a cross section according to line IV-IV in FIG. 2, wherein a compartment sealing system and hydraulic slide locking devices are visible.

FIG. 4 shows some details of the rotary part 5 with a cross section transversal to the radial axis. Specifically, the figure shows the continuous sealing gasket 40 which completely surrounds the compartment 35 in the rotary part 5 which, owing to the pressurized air present internally thereto, prevents liquids from entering and getting in contact with the electrical parts of the head 1. The presence of seals in all of the possible escape routes of the pressurized air contributes in keeping an air pressure inside the compartment 35 of the rotary part 5.

The rotary part 5 also comprises locking means for locking the radial slide 6 whenever it reaches its programmed radial position, said locking means comprising a plurality of locking pads 41 housed inside seats present in two gibs 42, these seats being supplied with the pressurized oil once again through the fluid collector. During the action exerted by the locking force, which uses a number of locking pads 41 for each of the two gibs 42, the radial slide 6 is pushed against the rotary part and the friction resulting therefrom prevents the operating force from making the radial slide 6 shift during minor finishing operations.

Figure 5:
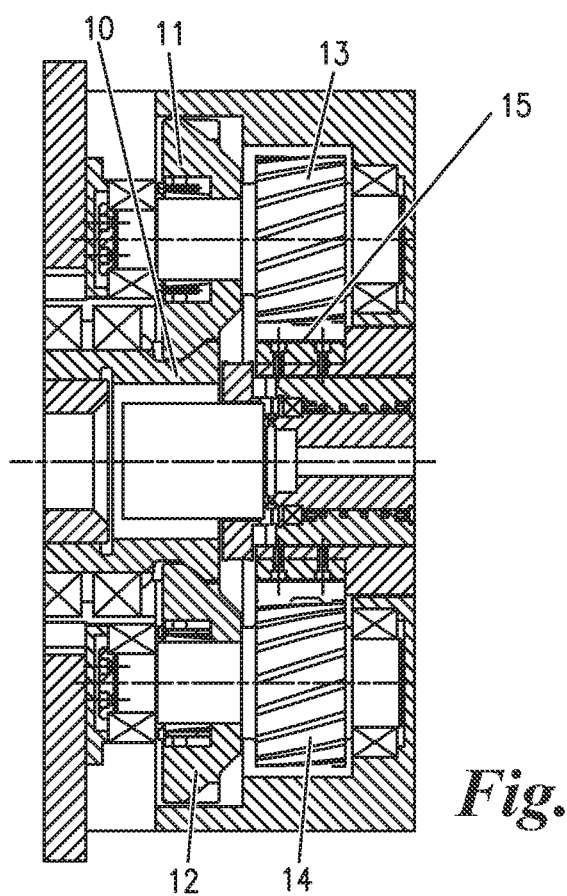
FIG. 5 shows a second detail of FIG. 1, wherein two gear chains, transmitting the rotary motion to the facing head, are visible.
Figure 6:
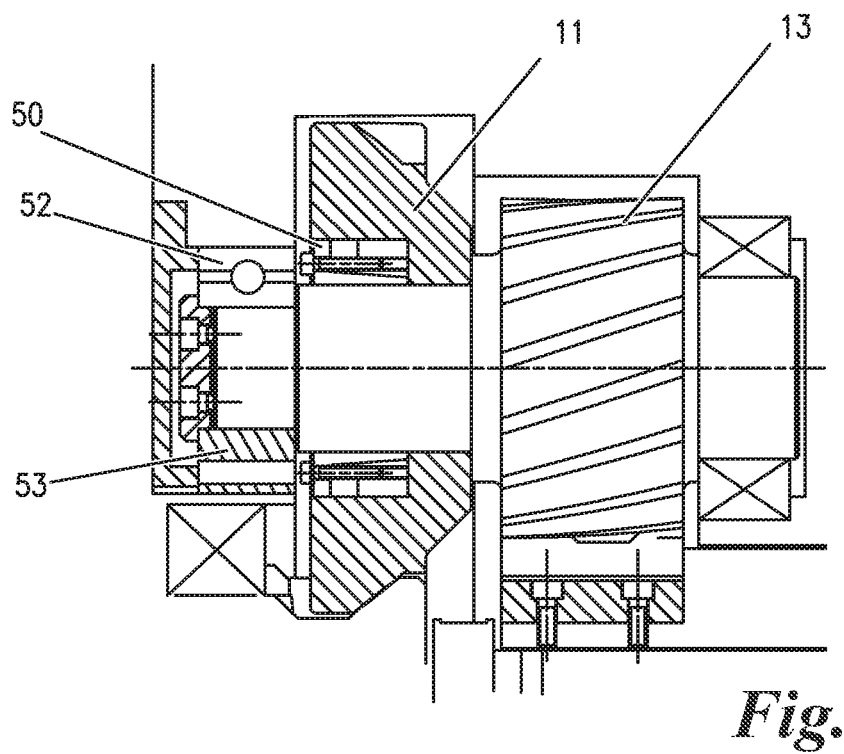
FIG. 6 shows a further detail of FIG. 5, which shows a shrink disk used to adjust the angular orientation of at least one of the gears.

FIG. 5 show in a more detailed manner the transmission of rotation from the spindle 8 of the machine tool 2 to the facing head 1, which includes two gear chains spanning from the gear 10, rotating together with the spindle 8, up to the gear 15, integral with the rotary part 5. Transmission takes place through the two gear chains comprising the gears 11 and 13 on one side and the gears 12 and 14 on the other side. Thanks to the two gear chains, whereby movement is transferred from the spindle 8 to the mobile part 5 of the facing head 1, an integer gear ratio is obtained equal to at least 2. More preferably, the integer gear ratio equals 4, in order to get a substantial increase in the torque available on the facing head 1.

In order to have the torque equally transmitted through the two gear chains, the shrink-fitting of at least one of said first gear 11, 12 on its respective shaft integral with a second gear 13, 14 is made adjustable by way of a shrink disk 50. For instance, FIG. 5 shows how a shrink-fitting of the gear 11 on the shaft integral with the gear 13 is made adjustable by way of said shrink disk 50, which allows to make the rotation coupling conditions equal to each other upon rotation. This adjustment is made possible by replacing a support bearing 52 with a perforated ring 53, which allows to insert a wrench and perform the adjustment operation and subsequently to lock the shrink disk 50. Finally, the bearing 52 is mounted in place of the ring 53.

We are now going to demonstrate that the invention solves the initially mentioned drawbacks.

The main object of the present invention is to make the head 1 sealed and prevent fluids from entering the inside of the rotary part 5 which accommodates the electrical parts. This is achieved by adopting a continuous sealing gasket 40 and pressurizing the complete inner part by means of pressurized air provided by the fluid collector.

A further object of the present invention is to have the torque transmitted by the two gear chains shared, which is achieved by adopting a shrink disk 50 which can be adjusted and fastened after recognizing that the geometric contact condition is sufficiently accurate. The equal torque sharing condition makes it possible to achieve more than one advantage. First of all, it extends the life time of bearings and gears. Secondly, it increases machining accuracy, considering that no deformations are caused in the presence of a load variation, whereas, under asymmetrical loading conditions, an increased flexural failure corresponds to an increased load.

Another object of the invention is to allow for an automatic locking of the radial slide 6, which has been made possible by the adoption of locking pads 41 housed in the two gibs 42, these locking pads being supplied with the pressurized oil through the fluid collector.

Many practical embodiments of the invention exist, some of which are described below, without departing from the scope of protection.

Another alternative way to embody the invention is that of employing one gear chain only for transmitting the rotation of the head, instead of two gear chains, or also that of employing more than two gear chains, for instance three or four. Naturally adopting at least two gear chain makes the loads acting onto the input and output gears symmetrical.

All solutions indicated above are also suitable for being adopted in heads equipped with two slides, with the addition of some considerations and adaptations that are simple to apply. The system for the radial driving of the two slides is obtained via one motor which moves both screws transmitting the radial motion of two slides, whereas the measurement system can be a rotary one and coupled with the rotation of the two screws, or can be applied directly to either slides.

The fluid collector of the head can also be used to supply the oil for unlocking the tool, should an appropriate tool holder system, provided with hydraulic unlocking facilities, be adopted. In this event, it is sufficient to provide a small hose that connects the rotary part of the head to the tool holder system.

Further alternative embodiments of the invention are foreseen without departing from the scope of protection of the present invention.

The invention claimed is:

1. A facing head (1) comprising:
a fixed part (4) couplable with a head of a machine tool (2) via an interface plate (3); and
a rotary part (5) which supports a radial slide (6),
wherein a compartment (35) is obtained in said rotary part (5), said compartment (35) containing drive means (100) and measurement means (101) for driving and measuring said radial slide (6), wherein said radial slide (6) is supported by said rotary part (5) so as to close the compartment (35), and wherein at least one electric collector (20) is located in said compartment (35), said least one electric collector (20) being configured for transmitting the electrical signals for controlling said drive means (100) and measurement means (101) used for driving and measuring said radial slide (6), said facing head (1) being characterized in that it comprises:
a continuous gasket (40) configured in such a way as to completely make contact with the radial slide (6), said gasket (40) being housed inside a respective recess (34) which externally surrounds the compartment (35); and
a fluid collector suitable for supplying said compartment (35) with pressurized air, so that the pressure inside the compartment (35) is higher than the atmospheric pressure, in order to seal the compartment (35), wherein said fluid collector comprises a rotary portion (22), which is integral with said rotary part (5) of the facing head (1) and comprises internally thereto first fluid routes (43), and a fixed portion (23), which is integral with said fixed part (4) of the facing head (1) and comprises internally thereto second fixed fluid routes (45) coupled with said first fluid routes (43) to supply said rotary part (5) with a coolant, to supply said compartment (35) with said pressurized air, and to transport oil used to implement automatic locking of the radial slide (6).

2. The facing head (1) according to claim 1, characterized in that said drive means (100) comprise:
a recirculating ball screw (16) held by a fixed support (17) which is fastened to the rotary part (5), a nut bracket (19) integral with the radial slide (6) sliding on said recirculating ball screw (16); and
an electric motor (31) fastened to the rotary part (5), said electric motor (31) transmitting rotation to the recirculating ball screw (16) via a reducer and gears (18, 30) thus allowing to move the radial slide (6).

3. The facing head (1) according to claim 2, characterized in that said measurement means (101) comprise a linear transducer which in turn comprises a magnetic scale (33) fastened to the rotary part (5) and a read head (32) fastened to the nut bracket (19).

4. The facing head (1) according to claim 1, characterized in that it comprises locking means for locking the radial slide (6) whenever the programmed radial position is reached, said locking means comprising a plurality of locking pads (41) housed inside seats cut in two gibs (42) of the mobile part (5), said seats being supplied with pressurized oil through said fluid collector.

5. The facing head (1) according to claim 1, characterized in that transmission of rotation is implemented by way of two gear chains, each comprising a first gear (11, 12) engaging an input gear (10) integral with a shaft (9) which is driven into rotation by a spindle (8) of the machine tool (2), each of said first gears (11, 12) being shrink fitted onto a shaft integral with a second gear (13, 14) which in turn engages a gear wheel (15) integral with said rotary part (5) of the facing head (1).

6. The facing head (1) according to claim 5, characterized in that the shrink fitting of at least one of said first gears (11, 12) on its respective shaft integral with a second gear (13, 14) is made adjustable by way of a shrink disk (50), in order for torque to be transmitted equally via the two gear chains.

7. The facing head (1) according to claim 5, characterized in that an integer gear ratio equal to at least 2 is obtained through said two gear chains, whereby movement is transferred by the spindle (8) to the mobile part (5) of the facing head (1).

8. The facing head (1) according to claim 7, characterized in that an integer gear ratio equal to 4 is obtained through said two gear chains.

9. The facing head (1) according to claim 1, characterized in that at least one two-button limit switch, which is driven by two cams integral with the radial slide (6), is also fastened to the rotary part (5) of the facing head (1).

10. A facing head (1) comprising:
a fixed part (4) couplable with a head of a machine tool (2) via an interface plate (3); and
a rotary part (5) which supports a radial slide (6),
wherein a compartment (35) is obtained in said rotary part (5), said compartment (35) containing a driver (100) and a measurer (101) for driving and measuring said radial slide (6), wherein said radial slide (6) is supported by said rotary part (5) so as to close the compartment (35), and wherein at least one electric collector (20) is located in said compartment (35), said least one electric collector (20) being configured for transmitting the electrical signals for controlling said driver (100) and measurer (101) used for driving and measuring said radial slide (6), wherein the facing head (1) comprises:
a continuous gasket (40) configured to completely make contact with the radial slide (6), said gasket (40) being housed inside a respective recess (34) which externally surrounds the compartment (35); and a fluid collector suitable for supplying said compartment (35) with pressurized air, so that the pressure inside the compartment (35) is higher than the atmospheric pressure, in order to seal the compartment (35), wherein said fluid collector comprises a rotary portion (22), which is integral with said rotary part (5) of the facing head (1) and comprises internally thereto first fluid routes (43), and a fixed portion (23), which is integral with said fixed part (4) of the facing head (1) and comprises internally thereto second fixed fluid routes (45) coupled with said first fluid routes (43) to supply said rotary part (5) with a coolant, to supply said compartment (35) with said pressurized air, and to transport oil used to implement automatic locking of the radial slide (6).

11. The facing head (1) according to claim 10, wherein said driver (100) comprises:
   a recirculating ball screw (16) held by a fixed support (17) which is fastened to the rotary part (5), a nut bracket (19) integral with the radial slide (6) sliding on said recirculating ball screw (16); and
   an electric motor (31) fastened to the rotary part (5), said electric motor (31) transmitting rotation to the recirculating ball screw (16) via a reducer and gears (18, 30) thus allowing to move the radial slide (6).

12. The facing head (1) according to claim 11, wherein the measurer (101) comprises a linear transducer which in turn comprises a magnetic scale (33) fastened to the rotary part (5) and a read head (32) fastened to the nut bracket (19).

13. The facing head (1) according to claim 10, further including a lock for locking the radial slide (6) whenever the programmed radial position is reached, said lock comprising a plurality of locking pads (41) housed inside seats cut in two gibs (42) of the mobile part (5), said seats being supplied with pressurized oil through said fluid collector.

14. The facing head (1) according to claim 10, wherein transmission of rotation is implemented by way of two gear chains, each comprising a first gear (11, 12) engaging an input gear (10) integral with a shaft (9) which is driven into rotation by a spindle (8) of the machine tool (2), each of said first gears (11, 12) being shrink fitted onto a shaft integral with a second gear (13, 14) which in turn engages a gear wheel (15) integral with said rotary part (5) of the facing head (1).

15. The facing head (1) according to claim 14, wherein the shrink fitting of at least one of said first gears (11, 12) on its respective shaft integral with a second gear (13, 14) is made adjustable by way of a shrink disk (50), in order for torque to be transmitted equally via the two gear chains.

16. The facing head (1) according to claim 14, wherein an integer gear ratio equal to at least 2 is obtained through said two gear chains, whereby movement is transferred by the spindle (8) to the mobile part (5) of the facing head (1).

17. The facing head (1) according to claim 16, wherein an integer gear ratio equal to 4 is obtained through said two gear chains.

18. The facing head (1) according to claim 10, wherein at least one two-button limit switch, which is driven by two cams integral with the radial slide (6), is also fastened to the rotary part (5) of the facing head (1).

* * * * *